United States Patent [19]

Chilton

[11] Patent Number: 4,750,291
[45] Date of Patent: Jun. 14, 1988

[54] TRAILER HOOK SYSTEM

[76] Inventor: Larry L. Chilton, 2209 5th St. North, Columbus, Miss. 39701

[21] Appl. No.: 11,807

[22] Filed: Feb. 6, 1987

Related U.S. Application Data

[63] Continuation-in-part of Ser. No. 941,328, Dec. 15, 1986, abandoned.

[51] Int. Cl.$^4$ ............................................. A01K 83/00
[52] U.S. Cl. ................................................. 43/44.82
[58] Field of Search .................. 43/44.82, 44.8, 42.16, 43/42.15, 42.11

[56] References Cited

U.S. PATENT DOCUMENTS

| 2,438,651 | 3/1948 | Schlegel | 24/18 |
|---|---|---|---|
| 2,700,242 | 1/1955 | Porth | 43/44.4 |
| 2,782,551 | 2/1957 | Raymond | 43/44.82 |
| 2,908,990 | 10/1959 | Rimbach | 43/44.82 |
| 2,922,247 | 1/1960 | Buss | 43/44 |
| 3,082,563 | 3/1963 | Mason | 43/43.16 |
| 3,462,179 | 8/1969 | Hinkle | 287/100 |
| 3,893,605 | 7/1975 | Mew | 403/344 |
| 4,280,296 | 7/1981 | Volenec | 43/44.82 |
| 4,470,217 | 9/1984 | Adams | 43/44.8 |
| 4,535,562 | 8/1985 | Fry | 43/44.95 |

FOREIGN PATENT DOCUMENTS

| 1014372 | 8/1957 | Fed. Rep. of Germany | 43/43.16 |
|---|---|---|---|
| 1085713 | 2/1955 | France | 43/43.16 |

*Primary Examiner*—Gene P. Crosby

[57] ABSTRACT

A trailer hook system for fishing, including a leading hook, such as a spinner bait, buzz bait or worm fishing hook, and a trailer hook. The trailer hook has a connector portion formed at one of its ends, and the leading hook has a positioning device at the midportion of its curved portion. The connecting portion and the positioning device enable the two hooks to be easily connected and disconnected. In addition, the trailer hook system in its operative position avoids undue twisting and sliding of the hooks relative to one another. When struck by an underwater object, the connector portion causes the trailer hook to pivot, minimizing the likelihood of the trailer hook snagging on the object.

11 Claims, 3 Drawing Sheets

TRAILER HOOK SYSTEM

CROSS-REFERENCE TO RELATED APPLICATION

This application is a continuation-in-part of U.S. patent application Ser. No. 941,328, filed Dec. 15, 1986, now abandoned.

BACKGROUND OF THE INVENTION

The present invention pertains to a trailer hook system for fishing, in which a trailer hook is attached to a leading hook. More particularly, the present invention pertains to a trailer hook system including a trailer hook attached to a spinner bait, buzz bait, worm fishing hook, or the like and including means for inhibiting relative longitudinal movement and twisting between the two hooks, while permitting rapid connection and disconnection.

To increase the chance of catching a large number of fish or other seafood, fisherman often attach multiple hooks onto a single line. The prior art illustrates a variety of ways in which multiple hooks can be attached to each other or to a common attachment device.

One of the more common ways of connecting one hook to another hook is the use of a rubber tube or a coil spring that is wrapped about the hooks, for example, as illustrated in U.S. Pat. Nos. 2,700,242 and 3,082,563. However, the use of an additional element such as the rubber tube or coil spring for connection has proven to be undesirable in that the tube or spring is difficult to apply and hence requires an undesirably long time for connection. Connectors of this type also have the deficiency of allowing the hook or hooks to move relative to each other in a twisting or sliding motion while in the water. Furthermore, connectors of this sort have the deficiency of allowing one or more of the hooks to get easily snagged or hung up on branches or the like while in the water.

Connectors that do not require additional elements to connect one hook to another include, for example, those illustrated in French patent No. 1,085,713 to Barreras. Barreras, unlike the present invention, relies on a permanent connection between a leading hook and a trailer hook. A permanent connection has proved to be too restrictive in that there are many situations where it is desirable to remove the trailer hook from the leading hook. For example, a fisherman using a trailer hook system may get a catch on the trailer hook and instead of removing the hook from the catch will want to detach the trailer hook from the leading hook. By keeping the hook in the catch, it is easier to connect the catch to a fish stringer or the like.

Additionally, permanent connectors, such as that illustrated in Barreras, have some of the same problems as that of connectors which utilize rubber tubing or the like, namely, the connectors do not prevent the twisting or the hanging up of the hook while the hook is in the water. Moreover, the permanent connectors allow the trailer hook to freely slide up and down the leading hook. Because the twisting motion and/or sliding motion of a hook is not conducive to catching fish, such movement is not favored by fishermen.

SUMMARY OF THE INVENTION

The present invention is a trailer hook system for fishing, providing improved performance, and overcoming the problems associated with the prior art. The trailer hook system in accordance with the present invention comprises a leading hook including an elongated straight portion, a curved portion, and a barb portion and having a positioner located near the middle of the curved portion on the inner surface of that curved portion. By way of examples, the leading hook can be a spinner bait, buzz bait or worm fishing hook; however, the invention is not restricted to such types of hooks. Releasably connected to the leading hook is a trailer hook likewise including an elongated straight portion, a curved portion and a barb portion and having a connector portion formed at the free end of its elongated straight portion. Each hook can be formed of a material commonly used in the making of fish hooks such as steel or other metal, plastic, or the like.

The connector portion preferably includes two interconnected partial rings, the first of the partial rings being larger than the second partial ring. The first partial ring is adjacent the end of the elongated straight portion. The second, smaller partial ring joins the first partial ring and is positioned to form the outer end of the hook remote from the curved portion. The partial rings have coinciding circumferential voids. Thus, the void in the first, larger ring is formed on the part of its surface remote from the elongated straight portion and coincides with the circumferential void in the second partial ring. The coinciding circumferential voids in the partial rings provide a slot or passageway through which elements of a thickness less than the length of the passageway can pass from the interior of one partial ring to the interior of the other, while elements of a greater thickness can not pass.

In one embodiment a notch is formed in the leading hook, near the junction of its elongated straight portion and its curved portion, and the slot of the trailer hook connector portion is sized to permit the notch to pass through the slot but to prevent the leading hook from otherwise passing therethrough. In a second embodiment, no notch is formed, but instead the slot is sized to permit the leading hook to snap therethrough under moderate urging.

The positioner on the curved portion of the leading hook preferably includes a first and a second protuberance which extend outwardly from the inner surface of the leading hook's curved portion and toward each other. The tips of the protuberances are positioned outwardly from the inner surface a length sufficient to keep the trailer hook between the protuberances once the connection of the trailer hook to the leading hook has been completed, for example in the order of about one-half the cross-sectional diameter of the trailer hook. In addition, the tips of the protuberances extend toward each other from their points of contact with the curved portion inner surface leaving a distance between the ends just slightly greater than the cross-sectional diameter of the trailer hook.

The trailer hook is easily connected to the leading hook. In the first embodiment, the barb of the leading hook is inserted through the larger partial ring of the trailer hook, the trailer hook is moved to the notch on the leading hook, the slot of the leading hook is passed over the notch so that the leading hook is then through the smaller partial ring, the trailer hook is rotated and moved to the positioner, one of the protuberances is passed through the slot, and then the trailer hook is again rotated, bringing the trailer hook system to its operative position.

In the second embodiment, the barb of the leading hook is inserted through the larger partial ring of the trailer hook, the trailer hook is moved to a position between the protuberances, the leading hook is snapped through the slot of the trailer hook connector portion, and the trailer hook is rotated to the operative position.

In either embodiment, removal of the trailer hook is as easy as connection of the hooks, merely involving the same steps in reverse order. Thus, both connection and disconnection of the trailer hook system can be achieved in a short period of time compared with prior art trailer hook systems.

When the trailer hook is in its operative position, the smaller of the partial rings encircles the leading hook between the two protuberances. Since the internal diameter of the smaller partial ring is only slightly greater than the cross-sectional diameter of the leading hook, relative twisting between the hooks is avoided. Furthermore, the external diameters of the two partial rings reduce the likelihood of the trailer hook snagging or hanging up on objects in the water. Thus, for example, if the trailer hook comes into contact with an object floating under water, the object first contacts the connector portion, causing the curved portion of the hook to pivot away from the object and thus preventing the barb from snagging on the object. The positioner on the leading hook prevents the trailer hook from sliding along the leading hook once the trailer hook is in its operative position.

Accordingly, this invention provides an improved trailer hook system which overcomes the problems associated with prior art trailer hook systems.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DETAILED DESCRIPTION OF A PREFERRED EMBODIMENT

Figure 1:
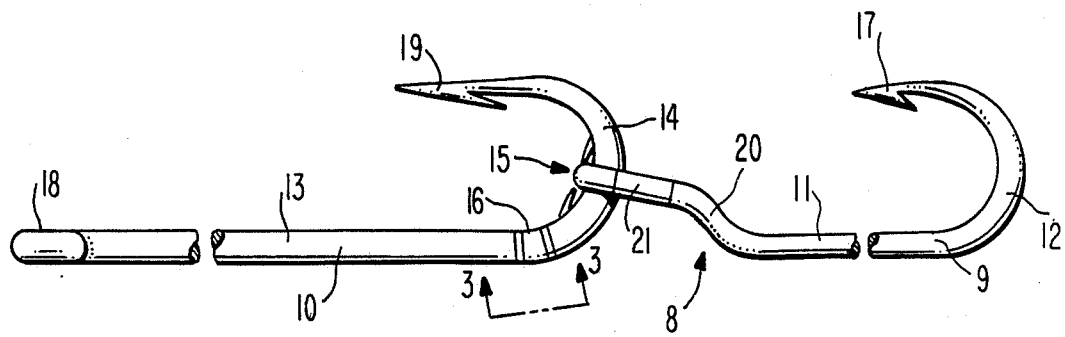
FIG. 1 is a side elevational view of a preferred embodiment of a trailer hook system in accordance with the present invention in its operative position.

FIG. 1 shows a trailer hook system 8, in accordance with a preferred embodiment of the present invention, made up of a trailer hook 9 and a leading hook 10. Trailer hook 9 includes barb 17, curved portion 12, elongated straight portion 11, and connector portion 21. Leading hook 10 includes barb 19, curved portion 14, elongated straight portion 13, and eyeloop 18 for fastening leading hook 10, and thus trailer hook system 8, to a fishing line. In a first embodiment of the invention, a cutout or notch 16 is formed in leading hook 10 approximately at the junction of straight portion 13 and curved portion 14.

Positioner 15 extends outwardly from the inner surface of curved portion 14 of leading hook 10, substantially midway along the curve, and when the trailer hook system is assembled in the operative position of FIG. 1, prevents trailer hook 9 from sliding along the surface of the leading hook 10.

As seen in FIG. 1, preferably trailer hook 9 includes an offset 20 so that, with connector portion 21 in its operative position within positioner 15, elongated straight portion 11 is substantially aligned with elongated straight portion 13 of leading hook 10 while barb 17 is substantially aligned with barb 19. However, this offset is not required.

Figure 2:
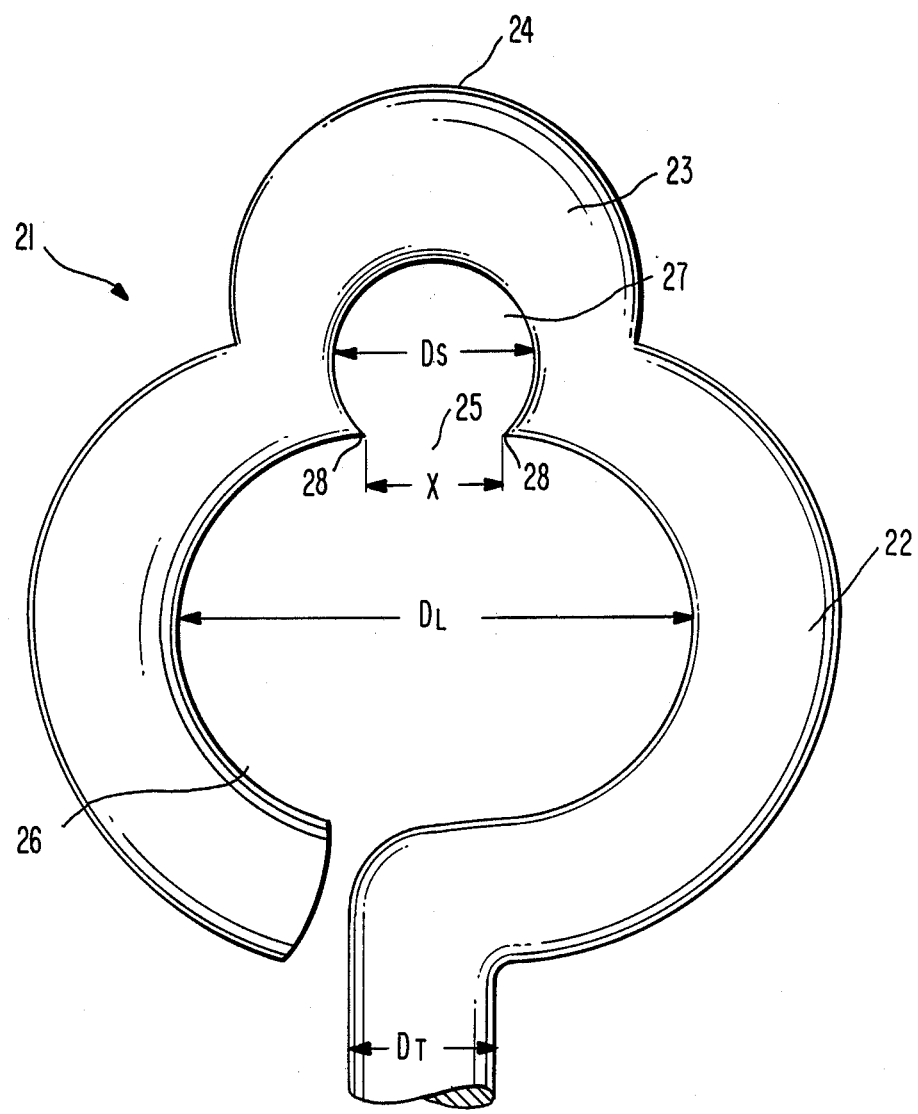
FIG. 2 is an enlarged, fragmentary plan view of a connector portion of a trailer hook suitable for incorporaton into the present invention.

FIG. 2 illustrates the connector portion 21 which extends from the end of straight portion 11 of trailer hook 9. Connector portion 21 includes two interconnected partial rings 22 and 23. Partial ring 22 has an inner diameter $D_L$ sufficient to enable partial ring 22 to pass over barb 19 of leading hook 10, by way of example, a diameter in the order of about one and a half to three times greater than the cross-sectional diameter $D_c$ (FIG. 3) of leading hook 10. Partial ring 23 has an inner diameter Ds slightly larger than the cross sectional diameter $D_c$ of leading hook 10.

The second, smaller partial ring 23 is positioned so that a portion of its outer surface forms the outer end 24 of trailer hook 9. Partial rings 22 and 23 have coinciding circumferential voids which provide a slot 25 through which elements can pass when being moved from the interior 26 of larger partial ring 22 to the interior 27 of smaller partial ring 23 or vice versa. Slot 25 has a length X which is less than or substantially the same as the cross sectional diameter $D_c$ of leading hook 10.

Figure 3:
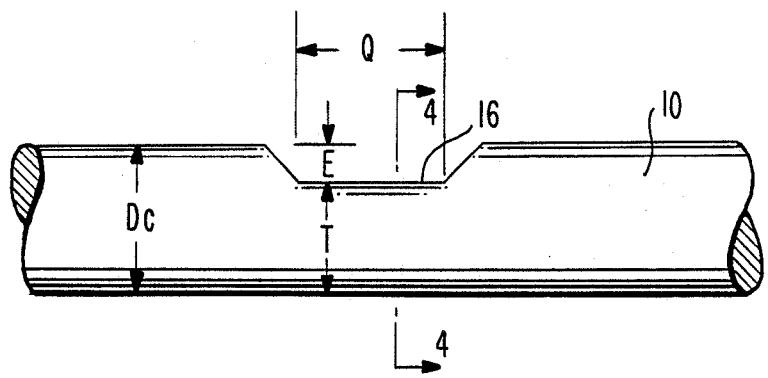
FIG. 3 is an enlarged fragmentary view taken along line 3—3 of FIG. 1.
Figure 4:
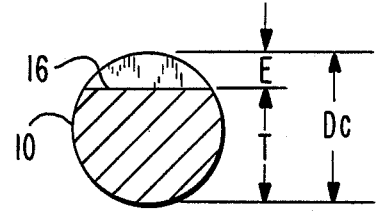
FIG. 4 is a cross-sectional view taken along the line 4—4 of FIG. 3.

As seen in FIGS. 3 and 4, notch 16 has a length Q and a depth E, leaving a thickness T. Thickness T is slightly less than the length X of slot 25, while the overall cross-sectional hook diameter $D_c$ is greater than length X. Length Q of notch 16 is slightly greater than the cross-sectional diameter $D_T$ (FIG. 2) of trailer hook 9.

Figure 5:
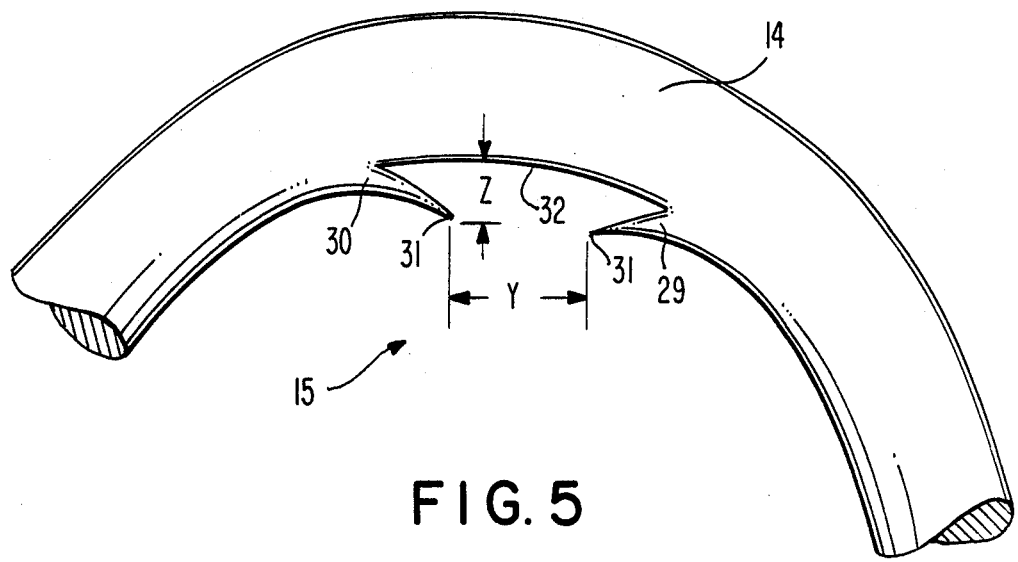
FIG. 5 is an enlarged fragmentary side elevational view of the curved portion of a leading hook, showing the positioner, in accordance with a preferred embodiment of the present invention.

FIG. 5 depicts positioner 15 which includes a first protuberance 29 and a second protuberance 30, each of which extends outwardly a distance Z from the inner surface 32 of curved portion 14 of leading hook 10. Length Z must be sufficient to enable protuberances 29 and 30 to prevent smaller partial ring 23 from sliding along curved section 14 of leading hook 10 when trailer hook 9 is in its operative position as depicted in FIG. 1, for example a length in the order of about one-half the cross-sectional diameter of $D_T$ of trailer hook 9. The tips 31 of protuberances 29 and 30 are separated by a distance Y which is just slightly greater than the diameter $D_T$ of trailer hook 9.

Figure 6A:
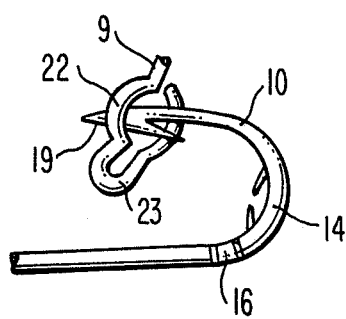
FIGS. 6A through 6D illustrate steps in connecting a preferred embodiment of a trailer hook system in accordance with the present invention.
Figure 6B:
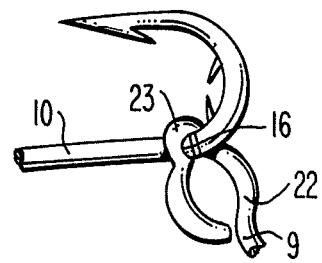
Figure 6C:
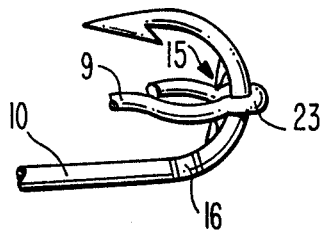
Figure 6D:
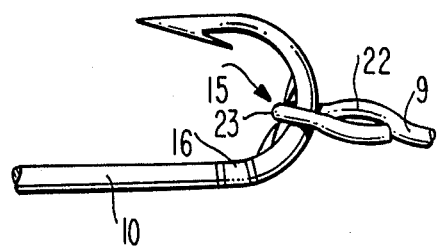

FIGS. 6A through 6D illustrate the manner of connecting the first embodiment of trailer hook 9 with leading hook 10 to form trailer hook system 8. As seen in FIG. 6A, barb 19 of leading hook 10 is inserted through larger partial ring 22 of trailer hook 9. Barb 19 may partially enter slot 25 and smaller partial ring 23 during this insertion, if desired. Larger partial ring 22 of trailer hook 9 is moved along leading hook 10 to notch 16. Trailer hook 9 is then rotated, and notch 16 is passed through slot 25 so that hook 10 is then passing through smaller partial ring 23, as illustrated in FIG. 6B. Trailer hook 9 is again rotated and moved to positioner 15 on leading hook 10, as illustrated in FIG. 6C, with protuberance 30 passing through slot 25. Trailer hook 9 is rotated a third time to place the trailer hook in its operative position, as illustrated in FIG. 6D. To disconnect the trailer hook this procedure is followed in reverse order.

In a second embodiment of the invention, the length X of slot 25 is substantially the same as the diameter $D_c$ of leading hook 10, so that the leading hook cannot freely pass through slot 25 but can be snapped therethrough under moderate urging. In such embodiment, no notch 16 is required. To connect the trailer hook of this embodiment to the leading hook, the barb 19 of the leading hook is passed through the larger partial ring 22 of the trailer hook, as depicted in FIG. 6A, and larger partial ring 23 is moved to the middle of positioner 15, between protuberances 29 and 30. Leading hook 10 is then snapped through slot 25, so that the leading hook passes through smaller partial ring 23 as depicted in FIG. 6C. Finally, trailer hook 9 is rotated to the operative position of FIG. 6D.

With trailer hook system 8 in the operative position of FIG. 1, both barb 19 and barb 17 are available for catching fish or other seafood. The curvatures of partial rings 22 and 23 of connector portion 21, and also offset 20, lessen the likelihood that trailer hook 9 will snag, since underwater objects will hit connector portion 21 or offset 20 and pivot trailer hook 9 away from the object. When a fish is caught on trailer hook 9, the trailer hook can be easily removed from leading hook 10, and fishing quickly resumed, either with another trailer hook or with only leading hook 10. Trailer hook 9 with the catch thereon can then easily be attached to a stringer. Alternatively, of course, the fish can be removed from trailer hook 9 and fishing resumed with the same trailer hook.

While the trailer hook system of the present invention has been described and exemplified in terms of preferred embodiments, those skilled in the art will appreciate that modifications can be made without departing from the spirit and scope of this invention.

What is claimed is:

1. A trailer hook system, comprising:
   a leading hook having an elongated substantially straight portion, a barb, and a curved portion joining said barb to said straight portion;
   a trailer hook having an elongated substantially straight portion, a barb, and a curved portion joining said barb to said straight portion;
   connecting means forming an end of said trailer hook straight portion remote from said curved portion for releasably connecting said trailer hook to said leading hook; and
   positioning means, formed on said leading hook, for maintaining said connecting means of said trailer hook within a defined area of said leading hook, said positioning means including a first protuberance and a second protuberance, each protuberance extending outwardly from said leading hook, the protuberances having tips spaced apart to leave an opening therebetween.

2. A system as claimed in claim 1 wherein said leading hook has a notch formed near the junction of said leading hook curved portion and straight portion, and wherein said connecting means includes a first partial ring adjacent said trailer hook straight portion and a second partial ring, each of said first partial ring and said second partial ring having a circumferential void, the circumferential voids coinciding to form a slot between the interiors of the two partial rings, said second partial ring having an internal cross-section slightly larger than the maximum external cross-section of said leading hook, said slot having a dimension greater than the minimum external cross-section of the notch, permitting said leading hook barb to be inserted through said first partial ring, said first partial ring then to be moved along said leading hook to the notch, the leading hook notch then to be passed through the slot so that said leading hook passes through said second partial ring, and said second partial ring then to be moved along said leading hook to said positioning means so that said trailer hook is releasably connected to said leading hook at said positioning means.

3. A system as claimed in claim 1 wherein said connecting means includes a first partial ring adjacent said trailer hook straight portion and a second partial ring, each of said first partial ring and said second partial ring having a circumferential void, the circumferential voids coinciding to form a slot between the interiors of the two partial rings, said second partial ring having an internal cross-section slightly larger than the maximum external cross-section of said leading hook, and said slot having a dimension substantially equal to the external cross-section of said leading hook at said positioning means, permitting said leading hook barb to be inserted through said first partial ring, said first partial ring then to be moved along said leading hook to said positioning means, and said leading hook to be snapped through said slot so that said leading hook passes through said second partial ring, said trailer hook then being releasably connected to said leading hook at said positioning means, while preventing said leading hook from freely passing through said slot.

4. A system as claimed in claim 1 wherein said positioning means is located substantially at the center of the curved portion of the leading hook.

5. A system as claimed in claim 4 wherein said leading hook has a notch formed near the junction of said leading hook curved portion and straight portion, and wherein said connecting means includes a first partial ring adjacent said trailer hook straight portion and a second partial ring, each of said first partial ring and said second partial ring having a circumferential void, the circumferential voids coinciding to form a slot between the interiors of the two partial rings, said second partial ring having an internal cross-section slightly larger than the maximum external cross-section of said leading hook, said slot having a dimension greater than the minimum external cross-section of the notch, permitting said leading hook barb to be inserted through said first partial ring, said first partial ring then to be moved along said leading hook to the notch, the leading hook notch then to be passed through the slot so that said leading hook passes through said second partial ring, and said second partial ring then to be moved along said leading hook to said positioning means so that said trailer hook is releasably connected to said leading hook at said positioning means.

6. A system as claimed in claim 5 wherein said slot has a dimension allowing said protuberances to pass through said slot.

7. A system as claimed in claim 4 wherein said connecting means includes a first partial ring adjacent said trailer hook straight portion and a second partial ring, each of said first partial ring and said second partial ring having a circumferential void, the circumferential voids coinciding to form a slot between the interiors of the two partial rings, said second partial ring having an internal cross-section slightly larger than the maximum external cross-section of said leading hook, and said slot having a dimension substantially equal to the external cross-section of said leading hook at said positioning means, permitting said leading hook barb to be inserted through said first partial ring, said first partial ring then to be moved along said leading hook to said positioning means, and said leading hook to be snapped through said slot so that said leading hook passes through said second partial ring, said trailer hook then being releasably connected to said leading hook at said positioning means, while preventing said leading hook from freely passing through said slot.

8. A system as claimed in claim 1 wherein the dimension of the space between the tips of said protuberances is slightly greater than the external cross section of said trailer hook.

9. A system as claimed in claim 1 wherein said leading hook and said trailer hook are fishing hooks.

10. A trailer hook system, comprising:
a leading hook having an elongated substantially straight portion, a barb, and a curved portion joining said barb to said straight portion, with a notch formed near the junction of said leading hook curved portion and straight portion;
a trailer hook having an elongated substantially straight portion, a barb, and a curved portion joining said barb to said straight portion;
connecting means forming an end of said trailer hook straight portion remote from said curved portion for releasably connecting said trailer hook to said leading hook; and
positioning means, formed on said leading hook, for maintaining said connecting means of said trailer hook within a defined area of said leading hook,
said connecting means including a first partial ring adjacent said trailer hook straight portion and a second partial ring, each of said first partial ring and said second partial ring having a circumferential void, the circumferential voids coinciding to form a slot between the interiors of the two partial rings, said second partial ring having an internal cross-section slightly larger than the maximum external cross-section of said leading hook, said slot having a dimension greater than the minimum external cross-section of the notch, permitting said leading hook barb to be inserted through said first partial ring, said first partial ring then to be moved along said leading hook to the notch, the leading hook notch then to be passed through the slot so that said leading hook passes through said second partial ring, and said second partial ring then to be moved along said leading hook to said positioning means so that said trailer hook is releasably connected to said leading hook at said positioning means.

11. A trailer hook system, comprising:
a leading hook having an elongated substantially straight portion, a barb, and a curved portion joining said barb to said straight portion;
a trailer hook having an elongated substantially straight portion, a barb, and a curved portion joining said barb to said straight portion;
connecting means forming an end of said trailer hook straight portion remote from said curved portion for releasably connecting said trailer hook to said leading hook; and
positioning means, formed on said leading hook, for maintaining said connecting means of said trailer hook within a defined area of said leading hook,
said connecting means including a first partial ring adjacent said trailer hook straight portion and a second partial ring, each of said first partial ring and said second partial ring having a circumferential void, the circumferential voids coinciding to form a slot between the interiors of the two partial rings, said second partial ring having an internal cross-section slightly larger than the maximum external cross-section of said leading hook, and said slot having a dimension substantially equal to the external cross-section of said leading hook at said positioning means, permitting said leading hook barb to be inserted through said first partial ring, said first partial ring then to be moved along said leading hook to said positioning means, and said leading hook to be snapped through said slot so that said leading hook passes through said second partial ring, said trailer hook then being releasably connected to said leading hook at said positioning means, while preventing said leading hook from freely passing through said slot.

* * * * *